July 12, 1932.    J. W. BRUNDAGE    1,867,304
SAFETY LOCK FOR PRESSES
Filed April 8, 1931
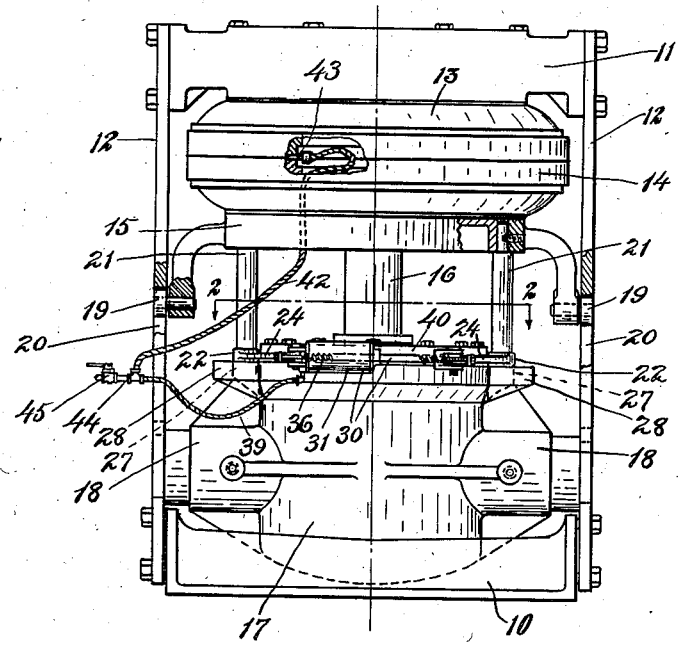
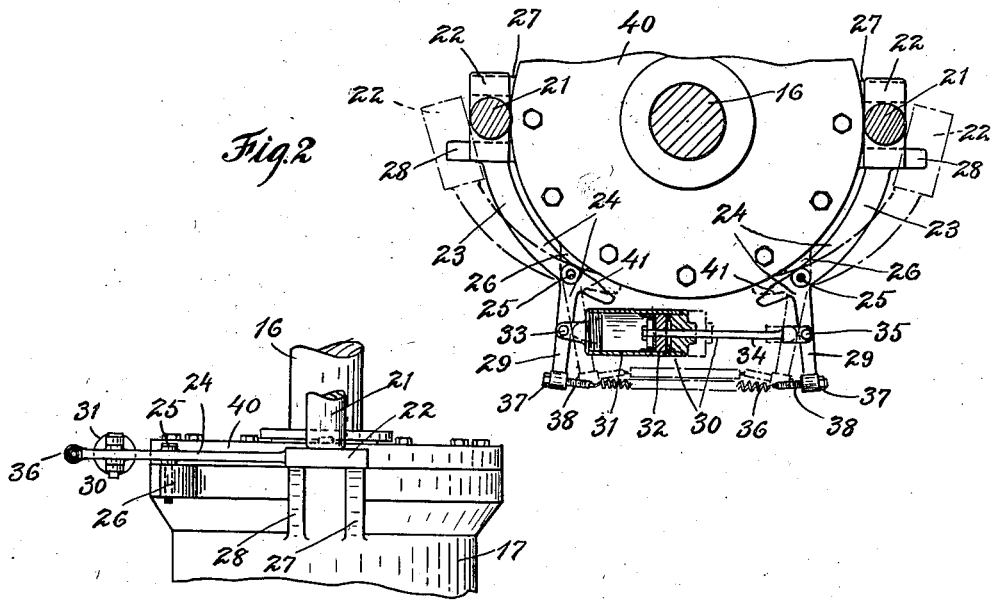
Inventor,
J. W. Brundage,
By Robert McPierson,
Attorney Patented July 12, 1932

1,867,304

UNITED STATES PATENT OFFICE

JAMES WILLIAM BRUNDAGE, OF AKRON, OHIO, ASSIGNOR TO THE SUMMIT MOLD & MACHINE COMPANY, OF AKRON, OHIO, A CORPORATION OF OHIO

SAFETY LOCK FOR PRESSES

Application filed April 8, 1931. Serial No. 528,527.

This invention relates to presses, and particularly those employed for molding and vulcanizing pneumatic tires, although not wholly restricted to that type.

My invention has for its object to provide an improved safety device for locking the press in its closed condition. In a pneumatic tire vulcanizing press, for example, in which the press members are closed by a fluid-pressure ram, and particularly a hydraulic ram, a safety lock which will prevent the press from opening prematurely in case the ram pressure should accidentally fail is a desirable feature, and my present invention fulfils that purpose in a simple and effective manner.

Of the accompanying drawing, Fig. 1 is a front elevation, partly in section, illustrating a ram-operated individual tire vulcanizer provided with a preferred form of my improved safety locking device.

Fig. 2 is a horizontal section on the line 2—2 of Fig. 1, on a slightly larger scale.

Fig. 3 is a side elevation of the parts shown in Fig. 2.

The particular vulcanizer press here illustrated is of the reciprocating and tilting platen type described in my copending application Serial No. 497,637, filed Nov. 24, 1930, but it will be understood that the invention may also be adapted to other reciprocating platen presses.

In the drawing, 10 is a horizontal base frame member connected with a horizontal overhead or top frame member 11 by a pair of upright side plates or frame members 12, 12. To the upper frame member 11 is bolted a steam-jacketed platen 13 having incorporated therewith one of a pair of mold members which mates with a complemental mold member incorporated in a movable steam-jacketed platen 14, the two members enclosing a molding cavity for the particular article to be treated, such as a pneumatic tire casing.

The lower platen 14 is secured to a reciprocating head or platform 15 carried at the upper end of a ram member or piston rod 16 whose piston works in a hydraulic cylinder 17. Said cylinder could have any suitable mounting but I have shown it in accordance with my aforesaid pending application as journaled by a pair of trunnions 18 in bearings on the frame plates 12, the reciprocating head 15 having a pair of rollers 19 carried by side brackets on the head and working in cam slots 20 formed in the side plates. These slots include vertical upper portions, shorter vertical lower portions forwardly offset therefrom and connecting inclined portions so that when the rollers are in the upper portions of the slots the movable platen and mold member 14 has a rectilinear motion toward and from the fixed platen and mold member 13, but when the ram descends toward the full-open position of the press parts, the cylinder and the movable platen carried by the ram are tilted forwardly to bring the lower mold member into a convenient position for loading and unloading.

In accordance with my present invention, I secure to the movable press head 15 a pair of downwardly-projecting rods 21 whose lower ends operate as abutments for coaction with a pair of locking plates 22 movable horizontally into and out of line with the rods. These plates are formed at the rear ends of the longer arms 23 of a pair of levers 24 pivoted at 25 upon supporting ears 26 which are formed on the upper rim of the cylinder 17. Said plates are slidingly supported on respective pairs of guide lugs 27, 28 which project from opposite sides of the upper edge of the cylinder and are spaced apart sufficiently to admit the downward passage between them of the rods 21 during the retracting movement of the latter, the front lug 28 in each pair being long enough to support the locking plates 22 when the latter are moved outwardly to their unlocking position.

The levers 24 are provided with respective forwardly-projecting short arms 29 which support a floating piston-and-cylinder motor or ram device 30 whose cylinder 31, provided with the piston 32, is pivoted at 33 to one of the lever arms 29 while the piston rod 34 is pivoted at 35 to the other lever arm 29. The forward extremities of the arms 29 are connected by a pull-spring 36 whose tension may be adjusted by means of nuts 37 fitted on screws 38 which pass freely through the end bosses of the arms. When fluid pressure is admitted to the rear end of the cylinder 31 through a flexible pipe 39 shown in Fig. 1, it will tend to move the bottom of said cylinder and the piston apart and spread the arms 29, thereby moving the plates 22 inwardly to their locking positions under the rods 21, and when said pressure is released from the cylinder, the spring 36 will draw the arms 29 together and move said locking plates outwardly from under the rods.

The main ram cylinder 17 is provided with a removable head 40 whose opposite edges are conveniently used as stops to limit the inward movement of the locking plates 22, and whichever of the two plates first reaches its stop will thereby be arrested, together with the cylinder or piston rod attached thereto, and the other member of the motor may then continue its movement and bring the corresponding locking plate against its stop. To limit the unlocking movement of the levers, they are provided with heel projections 41 adapted to encounter the forward edge of the cylinder cover 40.

I prefer to connect the cylinder 31 through its pipe 39 with the same source by which pressure fluid is supplied to the annular bag or core for inflating and stretching the tire casing during vulcanization, in order to avoid retraction of the described locking devices unless the tire bag is at the same time deflated. For this purpose the pipe 39 and another flexible pipe 42 which is provided for connection by the usual detachable coupling to the inflating stem 43 of the tire bag, are connected into a common supply pipe 44 which is provided with a control valve 45 on the anterior side of the point from which the two flexible pipes branch off. This valve may be operated either manually or through an automatic time control. Said valve is adapted to simultaneously charge or discharge the lock-operating cylinder and the tire bag with a liquid such as hot water or a gas such as air or other suitable fluid.

The operation will be readily understood from the foregoing. The lower mold and platen member is loaded with a raw tire, to be vulcanized, when said member is in its lowest position and tilted forwardly with the ram cylinder 17 through the action of the cam edges of the slots 20 upon the rollers 19, and in this position the rods 20 are depressed between the lugs 27, 28, the locking plates 22 being at this time outwardly retracted. When said platen has been returned by the action of the ram and moved vertically into mating relation with the fixed mold and platen 13, thereby raising the lower ends of the rods 21 just above the level of the upper sides of the locking plates 22, the valve 45 will be operated to simultaneously charge the lock-operating cylinder 31, and inflate the tire bag through the connection 43, and the molding and vulcanization of the tire as thus inflated by internal pressure may then proceed. At the same time the spreading of the forward arms of the levers 24 will carry the locking plates 22 inwardly under the rods 21 and against the cylinder head 40 and the press will be effectively locked in its closed position against accidental opening with consequent possible injury to persons or property in the vicinity or destruction of the tire under treatment in case the pressure in the ram cylinder 17 should fail or leak away while the pressure in the tire bag remains. When the press is to be opened, the tire bag and the lock-operating cylinder will first be exhausted by manipulating the valve 45 and the movable press parts will then be retracted by release of hydraulic pressure from the lower end of the ram cylinder 17 and admission of pressure to its upper end above the piston.

It will be understood that various changes in the described form of embodiment may be made without departing from the scope of my invention as defined in the claims.

I claim:

1. In a press, the combination of a fixed press head, of a fluid pressure ram device, a reciprocating press head carried thereby, a rod-like member projecting backwardly from said movable press head, away from the fixed head, and locking means movable into and out of the path of said member.

2. In a vulcanizing press, the combination of a mold including fixed and movable mold members, a press head carrying the movable member, fluid-pressure means for moving said press head, a pair of abutment members projecting rearwardly from opposite points on said press head, away from the fixed mold member, and locking means movable into and out of the path of said abutment members.

3. In a press, the combination of a fixed press head, a fluid-pressure ram device, a movable press head carried thereby and having a pair of abutment rods projecting backwardly from opposite sides thereof, away from said fixed head, a pair of pivoted locks oppositely movable into and out of the path of said rods, and means for concurrently moving said locks.

4. In a press, the combination of a movable press head having locking members, a pair of oppositely-movable pivoted locking levers coacting with said members for preventing retraction of said press head, and a floating fluid-pressure actuator carried by said levers for concurrently moving the latter.

5. In a press, the combination of a movable press head having locking abutments, a pair of oppositely-movable elements coacting with said abutments for locking said head, and a floating motor carried by said elements and including a cylinder attached to one of them and a piston attached to the other for concurrently operating said elements.

6. In a press, the combination of a movable press head having locking abutments, a pair of oppositely-movable locking elements therefor, coacting with said abutments, stops for limiting the movement of said elements in a locking direction, and a floating actuator carried by said elements for concurrently moving them to their locking positions.

7. In a press, the combination of a movable press head having locking abutments, a press-head operating ram device including a ram cylinder having a removable head, a pair of oppositely movable locking devices coacting with said abutments and having their locking movement limited by said cylinder head for preventing retraction of said press head, and floating means carried by said locking devices for concurrently moving them.

8. In a press, the combination of a movable press head having locking members, a pair of spring-retracted levers having locks for said head, coacting with said members, and floating power ram means carried by said levers for concurrently projecting them.

9. In a press, the combination of a movable press head having locking abutments, a pair of levers each having an arm provided with a lock for said head, coacting with one of said abutments, and an oppositely-projecting arm, means acting on the latter arms for spreading them and thereby moving the locks into locking position, and a pull-spring connecting the latter arms for drawing them together and thus retracting the locks, said spring having an adjustment for varying its tension.

10. In a press, the combination of a fixed press head, a movable press head having an abutment member projecting backwardly away from said fixed head, spaced lock-thrust resisting members for receiving said abutment member between them during its retracting movement, and a lock slidable over said resisting members into and out of the path of said abutment member when the latter is in its projected position.

11. In a press, the combination of a reciprocating and tilting press head having a locking member, a pivoted ram cylinder having a ram for actuating said head, and safety locking means supported by said cylinder and coacting with said member for preventing retraction of said press head.

12. In a press, the combination of a reciprocating and tilting press head, a pivoted ram cylinder having a ram carrying said head, a pair of abutment members projecting backwardly from said head on opposite sides of the ram cylinder, and a pair of locks pivoted on said cylinder and oppositely movable into and out of the path of said abutment members.

13. In a vulcanizing press, the combination of a vulcanizing mold having means for inflating the moldable article therein, a fluid-pressure ram device for closing the mold, a safety locking device for preventing opening of the mold in case the ram pressure should fail, fluid-pressure means for actuating said locking device, and a common source of pressure fluid supply for said article-inflating means and said lock-actuating means.

14. In a vulcanizing press, the combination of a vulcanizing mold including a reciprocating member and having means for inflating the moldable article therein, a fluid-pressure ram device for reciprocating the movable mold member, a second fluid-pressure ram device, a safety lock operated by the latter for preventing accidental retraction of the reciprocating mold member, and a valve controlled supply conduit branching to said article-inflating means and said second ram device respectively.

In witness whereof I have hereunto set my hand this 2nd day of April, 1931.

JAMES W. BRUNDAGE.